(12) United States Patent
Aliakseyeu et al.

(10) Patent No.: US 10,082,831 B2
(45) Date of Patent: Sep. 25, 2018

(54) DEVICE APPARATUS COOPERATION VIA APPARATUS PROFILE

(71) Applicant: PHILIPS LIGHTING HOLDING B.V., Eindhoven (NL)

(72) Inventors: Dzmitry Viktorovich Aliakseyeu, Eindhoven (NL); Jonathan David Mason, Waalre (NL); Berent Willem Meerbeek, Eindhoven (NL); Sanae Chraibi, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/779,706

(22) PCT Filed: Mar. 19, 2014

(86) PCT No.: PCT/IB2014/059956
§ 371 (c)(1),
(2) Date: Sep. 24, 2015

(87) PCT Pub. No.: WO2014/162229
PCT Pub. Date: Oct. 9, 2014

(65) Prior Publication Data
US 2016/0048166 A1  Feb. 18, 2016

Related U.S. Application Data

(60) Provisional application No. 61/807,808, filed on Apr. 3, 2013.

(51) Int. Cl.
*G06F 1/16* (2006.01)
*G06F 3/0354* (2013.01)
(Continued)

(52) U.S. Cl.
CPC ............ *G06F 1/1632* (2013.01); *G06F 3/038* (2013.01); *G06F 3/03547* (2013.01); *H04L 67/306* (2013.01)

(58) Field of Classification Search
CPC .... G06F 3/03547; G06F 1/1632; G06F 3/038; H04L 67/306
See application file for complete search history.

(56) References Cited

U.S. PATENT DOCUMENTS

| 5,579,487 A | 11/1996 | Meyerson et al. |
| 2007/0103447 A1 | 5/2007 | Varian et al. |

(Continued)

FOREIGN PATENT DOCUMENTS

JP  2010520528 A  6/2010

OTHER PUBLICATIONS

Webpage: http://reviews.productwiki.com/rca-rc85i, RCA RC85i Product Information, dated Jan. 2010, 1 page.

*Primary Examiner* — Abhishek Sarma (57) ABSTRACT

Devices (1) cooperate with apparatuses (2) in cooperation modes such as docking modes and smart desk modes and comprise interfaces (11) for receiving first signals from the apparatuses (2) comprising indications linked with profiles of the apparatuses (2) for indicating the cooperation modes. Sensors (12) sense in the cooperation modes user signals generated by users via the apparatuses (2) and controllers (13) analyze sensing results from the sensors in view of the profiles of the apparatuses (2) and control operations of the devices (1) in response to analysis results. The profiles of the apparatuses (2) may be pre-stored in the devices (1) or may be provided by the apparatuses (2) or may be retrieved from servers. The operations of the devices (1) may be controlled in dependence of parameters defining states of the devices (1) or of the apparatuses (2) or of the environment. The user (Continued)

signals may be generated by the users through touching surfaces (22) of the apparatuses (2).

15 Claims, 5 Drawing Sheets (51) Int. Cl.
*G06F 3/038* (2013.01)
*H04L 29/08* (2006.01)

(56) References Cited

U.S. PATENT DOCUMENTS

| | | |
|---|---|---|
| 2010/0081505 A1 | 4/2010 | Alten et al. |
| 2010/0214267 A1 | 8/2010 | Radivojevic et al. |
| 2011/0298736 A1 | 12/2011 | Madonna et al. |
| 2012/0155325 A1* | 6/2012 | Eichen ............... H04L 12/4633 370/254 |
| 2012/0197439 A1 | 8/2012 | Wang et al. |
| 2012/0271970 A1 | 10/2012 | Mason |
| 2012/0324135 A1* | 12/2012 | Goodman ............. G06F 1/1632 710/304 |
| 2013/0225233 A1* | 8/2013 | Elter .................. H04M 1/2535 455/552.1 |
| 2014/0075075 A1* | 3/2014 | Morrill ................ G06F 1/1632 710/303 |

\* cited by examiner

DEVICE APPARATUS COOPERATION VIA APPARATUS PROFILE

CROSS-REFERENCE TO PRIOR APPLICATIONS

This application is the U.S. National Phase application under 35 U.S.C. § 371 of International Application No. PCT/IB2014/059956, filed on Mar. 19, 2014, which claims the benefit of U.S. Provisional application 61/807,808, filed on Apr. 3, 2013. These applications are hereby incorporated by reference herein.

FIELD OF THE INVENTION

The invention relates to a device for in a cooperation mode cooperating with an apparatus. The invention further relates to an apparatus, to a server for providing a profile of the apparatus, and to a method for providing a profile of the apparatus.

Examples of such a device are portable phones and portable computers etc. Examples of such an apparatus are docking stations and smart desks etc.

BACKGROUND OF THE INVENTION

US 2011/0298736 A1 discloses an apparatus in the form of a docking station and a device in the form of a portable device that can be docked in the docking station.

When being docked, a user control of the portable device may become more difficult or even impossible.

SUMMARY OF THE INVENTION

It is an object of the invention to provide an improved device. Further objects of the invention are to provide an improved apparatus, a server and a method.

According to a first aspect, a device is provided for in a cooperation mode cooperating with an apparatus, the device comprising
- an interface for receiving a first signal from the apparatus, the first signal comprising an indication for indicating the cooperation mode, the indication being linked with a profile of the apparatus,
- a sensor for in the cooperation mode sensing a user signal generated by a user via the apparatus, and
- a controller for in view of the profile of the apparatus analyzing a sensing result from the sensor and for in response to an analysis result controlling an operation of the device.

The cooperation mode is for example a docking mode, without having excluded other kinds of modes. The interface of the device receives the first signal from the apparatus. Thereto, for example, the device detects a presence of the apparatus and requests the apparatus to send the first signal, or the apparatus detects a presence of the device and provides the first signal to the device. Alternatively, the first signal may be a response to another signal initiated in the device or in the apparatus. This first signal comprises the indication for indicating the cooperation mode. This indication may for example comprise the profile of the apparatus or may for example comprise a code or a number or an address etc. The code or the number or the address etc. may relatively directly define the profile of the apparatus or may relatively indirectly define the profile of the apparatus by defining an identity of the apparatus or a type of the apparatus etc. So, the indication is linked with the profile of the apparatus, as also further discussed below at the hand of two embodiments. The sensor of the device senses in the cooperation mode the user signal generated by the user via for example a surface of the apparatus. The controller of the device analyses the sensing result from the sensor at the hand of the profile of the apparatus and controls the operation of the device in response to the analysis result. As a result, the user has got an additional and/or alternative way for controlling an operation of the device when being in the cooperation mode, by generating a user signal via the apparatus, which user signal is to be sensed by a sensor of the device. Such an improved device can be controlled well by a user, even in a cooperation mode. This is a great advantage.

An embodiment of the device is defined by the profile of the apparatus being provided by the apparatus via the first signal, or the profile of the apparatus being provided by the apparatus via a second signal, whereby the interface is arranged to receive the second signal from the apparatus. In case the profile of the apparatus is provided by the apparatus, this may be done via the first signal comprising the indication as well as the profile, whereby the indication may form part of the profile or not, or this may be done via a second signal separately from the first signal, whereby the second signal comprises the profile. In the latter case, the interface of the device should be arranged to receive the second signal from the apparatus.

An embodiment of the device is defined by the profile of the apparatus being provided by a server via a third signal, the device further comprising a retriever for at the hand of the indication retrieving the third signal from the server via a network. In case the profile of the apparatus is provided by the server, the retriever of the device may retrieve this profile at the hand of the indication. Thereto, from the indication, a location defining the server or a part thereof is to be derived. This may be done in the device, in the server, in between them or somewhere else. Retrieving may for example comprise downloading etc. without having excluded other kinds of retrievals.

Alternatively or in addition, the profile of the apparatus may be provided via a user input entered into the device or into the apparatus, such as for example a manual input by a user of the profile itself or of a product code defining the profile etc.

An embodiment of the device is defined by the controller being arranged to further control the operation of the device in dependence of a parameter defining a state of the device and/or defining a state of the apparatus and/or defining a state of the environment. The state of the device and/or of the apparatus may be a previously started operation (data phase) or an operation to be started (signaling phase). As a result, the same user signal may have different impacts. For example, the same user signal in the form of a single tap on the surface of the apparatus may result in ending an ongoing call, stopping an alarm, interrupting the playing of music, accepting an incoming call and starting music to be played etc. The state of the environment may be a time, a date, an amount of light, a global positioning system coordinate, another coordinate and a temperature etc. and may be retrieved via an embedded or remote state detector, a user input, a database etc. without having excluded other kinds of state detectors.

An embodiment of the device is defined by the user signal being generated by the user via a surface of the apparatus through touching this surface. The touching may include tapping, scratching, swiping, flicking or any other touching by a hand or a finger or a fingernail or by a ring or a stylus or a wrist watch etc. Preferably, the device may have a learning mode or a programming mode, wherein the user may define a kind of a control of a kind of an operation for a kind of touch etc.

Possibly, the profile of the apparatus may be provided via a user calibration process whereby during or after a pairing procedure a user is invited to make one or more possibly predefined touches such as for example subsequently tapping at the left end, at the center and at the right end of the surface. The patterns of the calibration process may be analyzed and/or compared with stored patterns to determine and/or retrieve the appropriate profile of the apparatus etc. Further, this way, different users may be distinguished from each other. In addition, a user may enter into the device and/or into one or more apparatuses with which apparatuses the user wishes to interact, how the user wishes to interact with these apparatuses and which locations of the apparatuses are to be used for said interacting etc.

An embodiment of the device is defined by the profile of the apparatus defining mechanical and/or surface properties of the apparatus, and/or the profile of the apparatus defining one or more user signals and/or characteristics of one or more user signals. In case the profile defines mechanical and/or surface properties of the apparatus, the analysis of the sensing result from the sensor in view of the profile may comprise comparing the sensing result with results stored per one or more mechanical and/or surface properties or may comprise performing a calculation on/with the sensing result at the hand of one or more mechanical and/or surface properties etc. In case the profile of the apparatus defines one or more user signals and/or characteristics of one or more user signals, the analysis of the sensing result from the sensor in view of the profile may comprise comparing the sensing result with the one or more user signals and/or characteristics or may comprise performing a calculation on/with the sensing result at the hand of the one or more user signals and/or characteristics etc.

An embodiment of the device is defined by the apparatus comprising a docking station, and the cooperation mode comprising a docking mode, the device further having at least one other mode different from the docking mode. The at least one other mode is a mode that is fully independent from the docking mode and from the apparatus, such as for example a stand alone mode and a network mode etc.

An embodiment of the device is defined by the apparatus comprising a smart desk, and the cooperation mode comprising a smart desk mode, the device further having at least one other mode different from the smart desk mode. The at least one other mode is a mode that is fully independent from the smart desk mode and from the apparatus, such as for example a stand alone mode and a network mode etc.

An embodiment of the device is defined by the sensor comprising a microphone, a camera, a light detector, a proximity detector and/or an accelerometer.

An embodiment of the device is defined by the operation of the device comprising a control of an operation of the apparatus, the operation of the apparatus comprising an audio reproduction, an audio recording, a video reproduction, a video recording, a light and/or aroma production and/or a light recording. The control may comprise starting, stopping, interrupting, selecting and adapting the operation or parameters thereof etc. A light recording for example comprises a measurement of (an amount of) incoming light etc.

An embodiment of the device is defined by the operation of the device comprising an audio reproduction, an audio recording, a video reproduction, a video recording, an audio call, a video call, an exchange of a message and/or an internet visit. The control of the operation of the device may comprise, in a simple case, a provision of information to the device or to the user, and may comprise, in a more complex case, starting, stopping, interrupting, selecting and adapting the operation and/or parameters thereof etc.

An embodiment of the device is defined by the cooperation mode comprising an electrical cooperation and/or a mechanical cooperation. Via the electrical cooperation, signals can be exchanged. Via the mechanical cooperation, support is provided from the apparatus to the device. The electrical cooperation may be a wired cooperation mode such as for example a docking mode etc. and may be a wireless mode such as for example a smart desk mode etc. However, it is not to be excluded that the docking mode may comprise a wireless mode and that the smart desk mode may comprise a wired mode etc.

According to a second aspect, an apparatus is provided for in a cooperation mode cooperating with a device, the apparatus comprising
    an interface for sending a first signal to the device, the first signal comprising an indication for indicating the cooperation mode, the indication being linked with a profile of the apparatus, and
    a surface for in the cooperation mode allowing a user to generate a user signal to be sensed by the device in the cooperation mode.

Preferably, the profile of the apparatus may be provided by the apparatus via the first signal, or the profile of the apparatus may be provided by the apparatus via a second signal, whereby the interface is arranged to send the second signal to the device. Preferably, the profile of the apparatus may define mechanical and/or surface properties of the apparatus, and/or the profile of the apparatus may define one or more user signals and/or characteristics of one or more user signals.

According to a third aspect, a server is provided for providing a profile of an apparatus to a device as defined above, the server being configured to
    receive a request for the profile of the apparatus from the device, and
    in response to the request, provide the profile of the apparatus to the device.

According to a fourth aspect, a method is provided for providing a profile of an apparatus to a device as defined above, the method comprising steps of
    receiving a request for the profile of the apparatus from the device, and
    in response to the request, providing the profile of the apparatus to the device.

A basic idea is that an indication for indicating a cooperation mode and a profile of the apparatus are to be linked and that a sensing result from a sensor of a device in the cooperation mode is to be analyzed at the hand of said profile for controlling an operation of the device.

A problem to provide an improved device and an improved apparatus has been solved. A further advantage is that a user friendliness of the device and a user friendliness of the apparatus have been increased and that more options for operations have become possible and that an application area of the device and an application area of the apparatus have been extended by mainly using the already existing hardware.

These and other aspects of the invention will be apparent from and elucidated with reference to the embodiments described hereinafter.

DETAILED DESCRIPTION OF EMBODIMENTS

Figure 1:
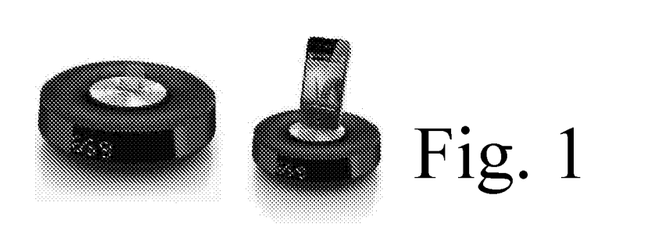
FIG. 1 shows a first combination of a device and an apparatus.

In the FIG. 1, a first combination of a device and an apparatus is shown, the device comprising a portable device such as a mobile phone or an audio/video player and the apparatus comprising a clock radio with a docking possibility for the portable device.

Figure 2:
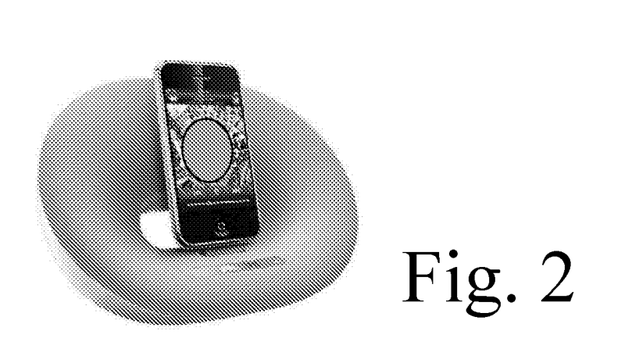
FIG. 2 shows a second combination of a device and an apparatus.

In the FIG. 2, a second combination of a device and an apparatus is shown, the device comprising a portable device such as a mobile phone or an audio/video player and the apparatus comprising a docking station for the portable device.

Figure 3:
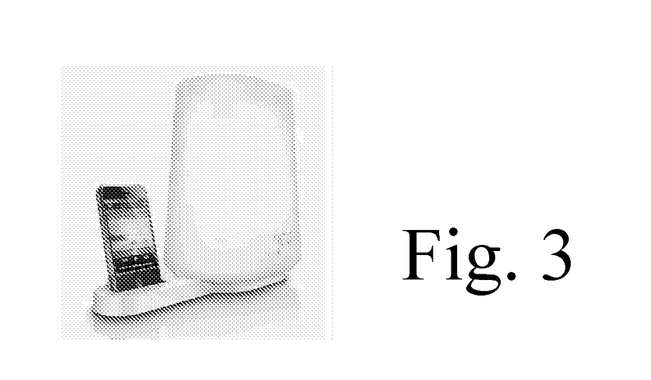
FIG. 3 shows a third combination of a device and an apparatus.

In the FIG. 3, a third combination of a device and an apparatus is shown, the device comprising a portable device such as a mobile phone or an audio/video player and the apparatus comprising a wake up lamp with a docking possibility for the portable device.

Figure 4:
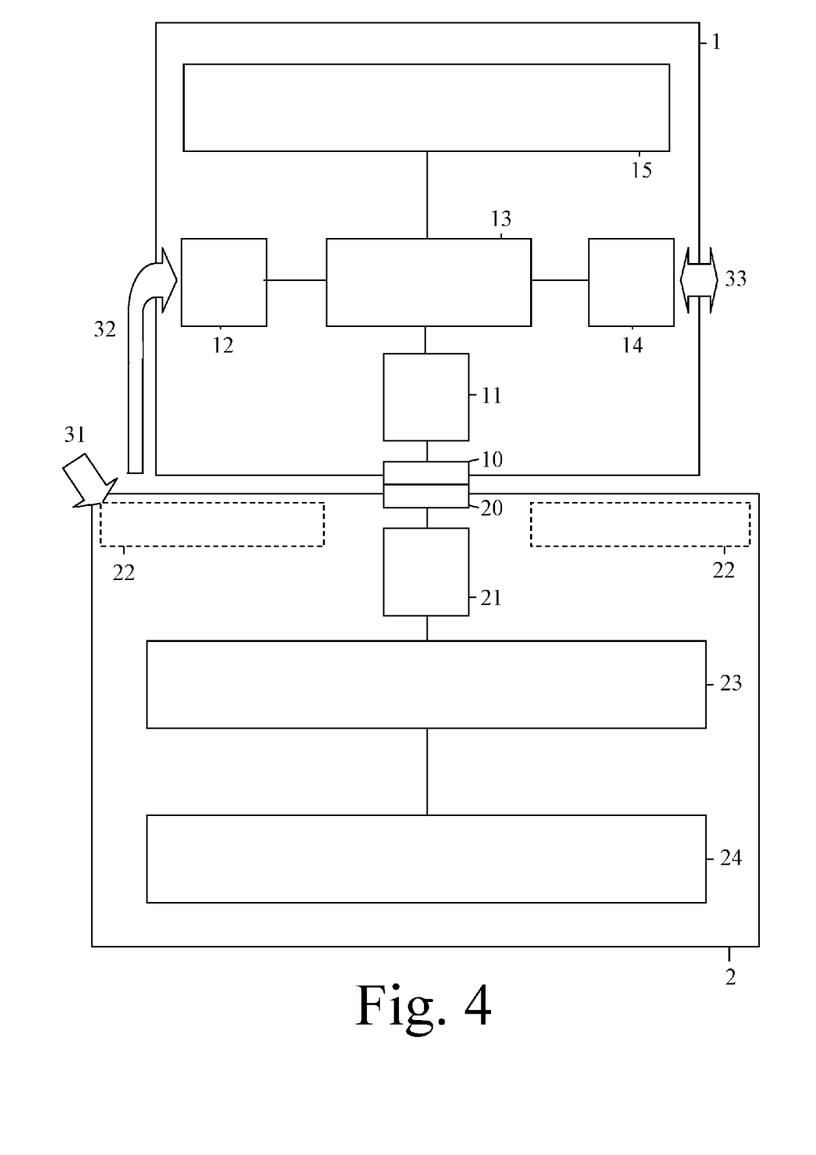
FIG. 4 shows a device and an apparatus schematically.

In the FIG. 4, a device 1 and an apparatus 2 are shown schematically. The device 1 comprises a connector 10 coupled to an interface 11 and comprises a controller 13 coupled to the interface 11. The device 1 further comprises a sensor 12 such as a microphone, a camera, a light detector, a proximity detector and/or an accelerometer etc. coupled to the controller 13. The device 1 further comprises for example a retriever 14 and a man-machine-interface 15 both also coupled to the controller 13. The apparatus 2 comprises a connector 20 coupled to an interface 21 and comprises a surface 22. The apparatus 2 further comprises a controller 23 coupled to the interface 21. The apparatus 2 further comprises for example a man-machine-interface 24 coupled to the controller 23. The connectors 10 and 20 are to be connected mechanically to each other, but alternatively they may be left out and the interfaces 11 and 21 may then communicate in a wireless way with each other. Each controller 13, 23 may comprise a processor and a memory.

The interface 11 of the device 1 receives a first signal from the apparatus 2. Thereto, for example, via the connectors 10 and 20, the device 1 may detect a presence of the apparatus 2 and may then request the apparatus 2 to send a first signal, or the apparatus 2 may detect a presence of the device 1 and may then provide the first signal to the device 1. Alternatively, said detections may take place in a wireless way via the interfaces 11 and 21, and/or the first signal may be a response to another signal initiated in the device or in the apparatus, for example via a pairing procedure. The first signal comprises an indication for indicating a cooperation mode such as a docking mode. This indication is linked with a profile of the apparatus 2, as follows.

According to a first option, the indication comprises a code, with the profile of the apparatus 2 being pre-stored in the device 1. Through a reception of the code, the device 1 is informed about the cooperation mode, and through its memory, the device 1 has access to the profile of the apparatus 2. According to a second option, the indication comprises a code or an address, with the profile of the apparatus 2 being pre-stored in the memory of the device 1 at a location defined by the code or the address. According to a third option, the profile of the apparatus 2 is provided by the apparatus 2 via the first signal comprising the indication as well as the profile, whereby the indication may form part of the profile (the fact that the profile is sent could be considered to be an indication for indicating the cooperation mode). According to a fourth option, the profile of the apparatus 2 is provided by the apparatus 2 via a second signal to be exchanged via the interfaces 21 and 11. According to a fifth option, the indication comprises a code, with an identity or a type of the apparatus 2 being pre-stored in the device 1. Through a reception of the code, the device 1 is informed about the cooperation mode, and through its memory, the device 1 knows the identity or the type of the apparatus 2 and uses this knowledge to access a server via a network. Thereto, the retriever 14 retrieves via a communication 33 the profile from the server. Via a third signal, the profile is sent from the server to the device 1. According to a sixth option, the indication comprises a code or an address defining a location in the server. Through a reception of the code or the address, the device 1 is informed about the cooperation mode, and uses this code or this address to access a server via a network. The retriever 14 then retrieves the profile from the server via a communication 33. In other words, via a third signal, the profile is sent from the server to the device 1.

The sensor 12 of the device 1 senses, as indicated by an arrow 32, in the cooperation mode a user signal generated by the user via the apparatus 2, for example by touching the surface 22 of the apparatus 2, as indicated by an arrow 31. Said touching may comprise tapping, scratching, swiping, flicking or any other touching by a hand or a finger or a fingernail or by a ring or a stylus or a wrist watch etc. The controller 13 of the device 1 analyses the sensing result from the sensor 12 in view of the profile of the apparatus 2 and controls the operation of the device 1 in response to the analysis result. As a result, the user has got an additional and/or alternative way for controlling an operation of the device 1 when being in the cooperation mode. The operation of the device 1 that is controlled may comprise its own operation and may comprise a control of an operation of the apparatus 2.

As an example only, when the device 1 or the apparatus 2 is playing music, flicking from left to right on the surface 22 may result in a selection of a next song, and flicking from right to left on the surface 22 may result in a selection of a previous song. Tapping several times at a first location of the surface 22 may result in reducing a volume of the music, and tapping several times at another location of the surface 22 may result in increasing the volume of the music etc.

In the FIG. 4, said cooperation mode comprises a docking mode and the apparatus 2 comprises a docking station such as a clock radio or a wake up lamp. Usually, the device 1 will have, in addition to the cooperation mode, at least one other mode different from the docking mode, such as a stand alone mode or a network mode etc.

The controller 13 may further control the operation of the device 1 in dependence of a parameter defining a state of the device 1 and/or defining a state of the apparatus 2 and/or defining a state of the environment. As a result, the same user signal may have different impacts depending on one or more of said states.

The profile of the apparatus 2 may define mechanical and/or surface properties of the apparatus 2, in which case the analysis of the sensing result from the sensor 12 in view of the profile may comprise comparing the sensing result with results stored per one or more mechanical and/or surface properties or may comprise performing a calculation on/with the sensing result at the hand of one or more mechanical and/or surface properties etc. The profile of the apparatus 2 may alternatively or in addition define one or more user signals and/or characteristics of one or more user signals, in which case the analysis of the sensing result from the sensor in view of the profile may comprise comparing the sensing result with the one or more user signals and/or characteristics or may comprise performing a calculation on/with the sensing result at the hand of the one or more user signals and/or characteristics etc. The mechanical and/or surface properties may comprise a size and a weight of the apparatus 2 and may define a type of material that has been used to create the apparatus 2 etc.

According to the fifth and sixth options, the server provides the profile of the apparatus 2 to the device 1 and is thereto configured to receive a request for the profile of the apparatus 2 from the device 1, and is thereto configured to, in response to the request, provide the profile of the apparatus 2 to the device 1. A method provides the profile of the apparatus 2 to the device 1 and thereto comprises a step of receiving a request for the profile of the apparatus 2 from the device 1, and thereto comprises a step of, in response to the request, providing the profile of the apparatus 2 to the device 1. In both cases the request may comprise the knowledge about the identity or the type of the apparatus 2 and/or may comprise the code or the address defining a location where the profile of the apparatus 2 can be found.

Figure 5:
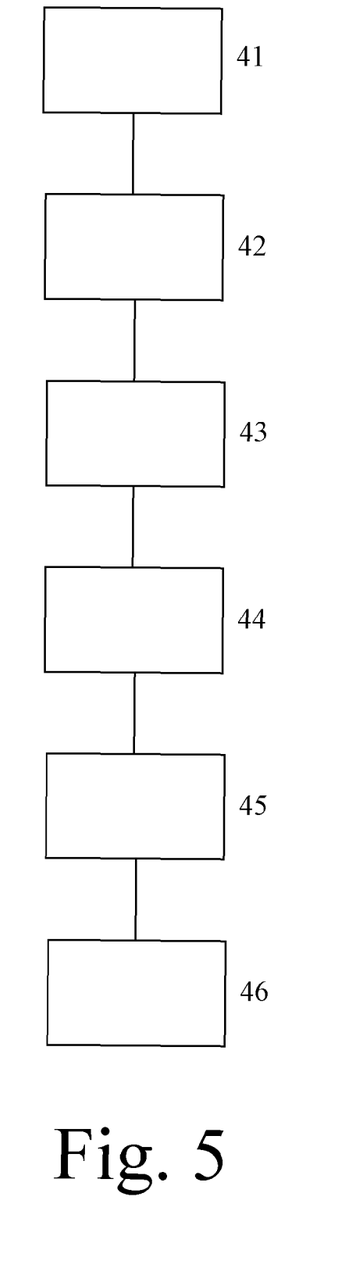
FIG. 5 shows a flow chart.

In the FIG. 5, a flow chart is shown, wherein the following blocks have the following meaning:
Block 41: The device 1 detects a docking mode.
Block 42: The apparatus 2 sends a profile to the device 1 or the device 1 retrieves the profile from its own memory or from a server.
Block 43: The sensor 12 starts listening.
Block 44: The controller 13 analyzes a sensing result from the sensor 12 in view of the profile of the apparatus 2.
Block 45: The analysis result is checked to determine whether it is valid and to determine how a user has touched a surface of the apparatus 2.
Block 46: The controller 13 controls an operation of the device 1 in response to the analysis result, the operation of the device 1 that is controlled comprises its own operation or an operation of the apparatus 2 and/or depends upon one or more states of the device 1, the apparatus 2 and the environment (when for example a single tap is recognized, in the evening relaxing music is paused, and in the morning an alarm is snoozed).

This flow chart is an example only. Many other flow charts will be possible and can be derived from the introduction and from the descriptions of the other drawings.

Figure 6:
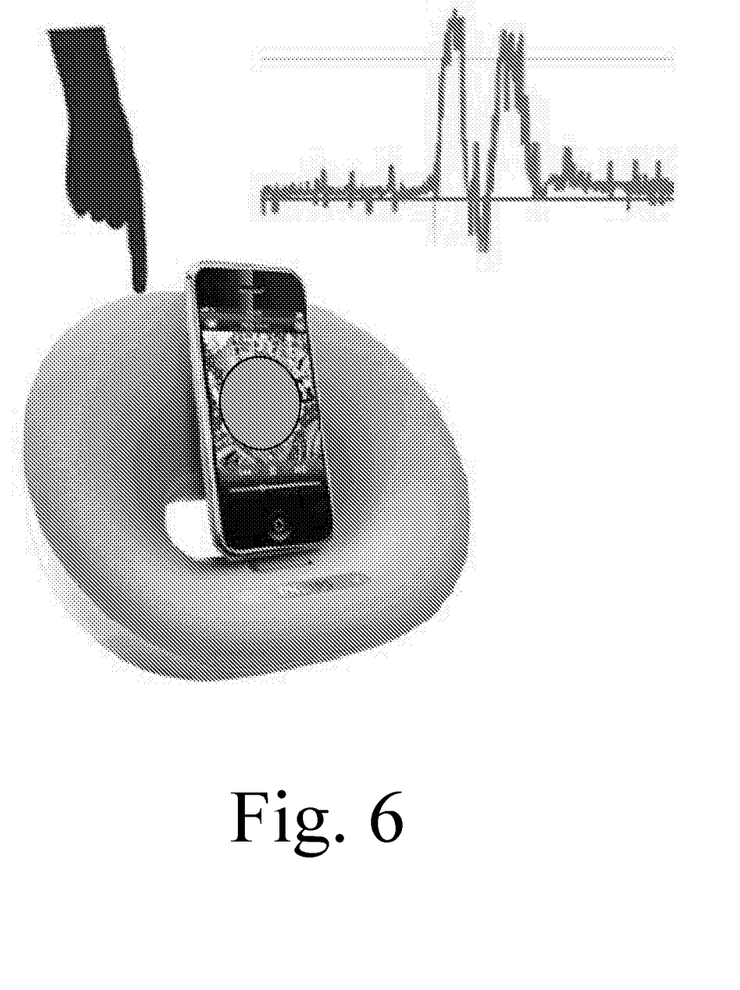
FIG. 6 shows the second combination while being touched.

In the FIG. 6, the second combination is shown while being touched. Further shown is a user signal produced in response to the touch, as for example detected by a sensor 12 in the form of an accelerometer etc. This user signal may be compared with stored user signals to determine the kind of touch. Alternatively, a characteristic of this user signal may be derived and compared with stored characteristics to determine the kind of touch. Further alternatively, a calculation may be made at the hand of such a user signal or at the hand of such a characteristic to determine the kind of touch etc.

Figure 7:
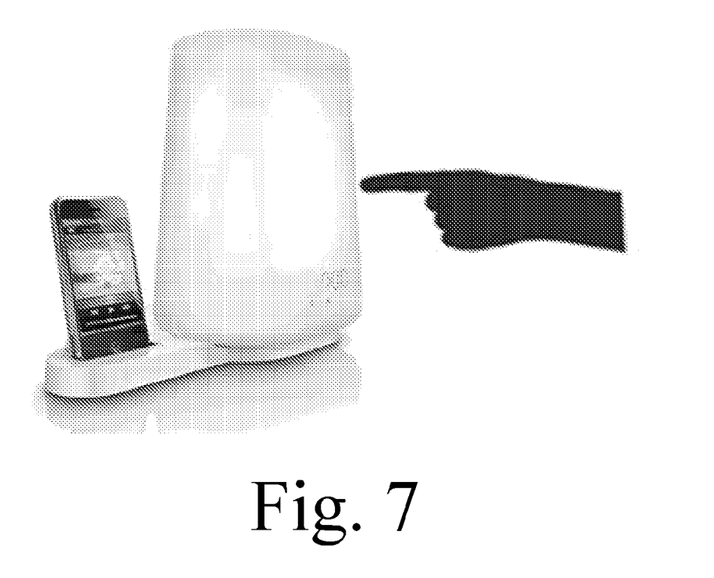
FIG. 7 shows the third combination while being touched.

In the FIG. 7, the third combination is shown while being touched. The touch will result in the detection of a user signal as discussed before.

Figure 8:
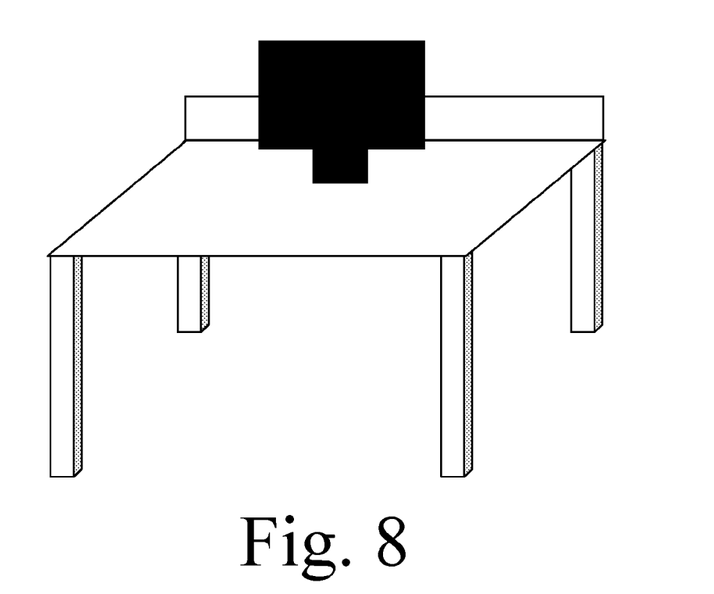
FIG. 8 shows a fourth combination of a device and an apparatus.

In the FIG. 8, a fourth combination of a device and an apparatus is shown, the device comprising a portable computer, and the apparatus comprising a smart desk. The cooperation mode here comprises a (wireless) smart desk mode, and usually the device will have at least one other mode different from the smart desk mode, such as a stand alone mode or a network mode etc. In this case, the interfaces will be wireless interfaces. By tapping on the smart desk, a user may answer a video call. By flicking the smart desk, a user may turn a page of a document or a book shown on the portable computer etc.

Summarizing, devices 1 cooperate with apparatuses 2 in cooperation modes such as docking modes and smart desk modes and comprise interfaces 11 for receiving first signals from the apparatuses 2 comprising indications linked with profiles of the apparatuses 2 for indicating the cooperation modes. Sensors 12 sense in the cooperation modes user signals generated by users via the apparatuses 2 and controllers 13 analyze sensing results from the sensors in view of the profiles of the apparatuses 2 and control operations of the devices 1 in response to analysis results. The profiles of the apparatuses 2 may be pre-stored in the devices 1 or may be provided by the apparatuses 2 or may be retrieved from servers. The operations of the devices 1 may be controlled in dependence of parameters defining states of the devices 1 or of the apparatuses 2 or of the environment. The user signals may be generated by the users through touching surfaces 22 of the apparatuses 2.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A device for cooperating with an apparatus in a cooperation mode, the device comprising:
   an interface configured to receive a first signal from the apparatus, the first signal comprising an indication for indicating the cooperation mode, the indication being associated with a profile of the apparatus, the profile defining one or more user signals or characteristics of one or more user signals;
   a sensor configured to detect, in the cooperation mode, an interaction between a user and the apparatus based on a desired operation of the device generated by the user via the apparatus, said sensor configured to generate a user signal based on said interaction, wherein the user signal or a characteristic of the user signal is defined by the user; and
   a controller coupled with the interface and the sensor and configured to analyze said user signal or said characteristic of said user signal from the sensor based on the profile of the apparatus to generate an analysis result, and configured to control said device based on said analysis result.

2. The device as defined in claim 1, wherein the profile of the apparatus is provided by the apparatus via the first signal, or via a second signal, whereby the interface is arranged to receive the second signal from the apparatus.

3. The device as defined in claim 1, further comprising a retriever configured to retrieve a third signal from a server via a computer network, wherein the third signal comprises data representing the profile of the apparatus.

4. The device as defined in claim 1, wherein the controller is arranged to further control the operation of the device in dependence of a parameter defining one or more of a state of the device, a state of the apparatus, and a state of the environment.

5. The device as defined in claim 1, wherein the user signal is generated by the user via a surface of the apparatus through touching said surface.

6. The device as defined in claim 1, wherein the profile of the apparatus defines mechanical or surface properties of the apparatus.

7. The device as defined in claim 1, wherein the apparatus comprises a docking station, and the cooperation mode comprises a docking mode, the device further having at least one other mode different from the docking mode.

8. The device as defined in claim 1, wherein the apparatus comprises a smart desk, and the cooperation mode comprises a smart desk mode, the device further having at least one other mode different from the smart desk mode.

9. The device as defined in claim 1, wherein the sensor comprises at least one of a microphone, a camera, a light detector, a proximity detector, and an accelerometer.

10. The device as defined in claim 1, wherein the operation of the device comprises a control of an operation of the apparatus, the operation of the apparatus comprising one or more of an audio reproduction, an audio recording, a video reproduction, a video recording, a light and/or aroma production, and a light recording.

11. The device as defined in claim 1, wherein the operation of the device comprises one or more of an audio reproduction, an audio recording, a video reproduction, a video recording, an audio call, a video call, an exchange of a message, and an internet visit.

12. The device as defined in claim 1, wherein the cooperation mode comprises at least one of an electrical cooperation and a mechanical cooperation.

13. An apparatus for cooperating with a device in a cooperation mode, the apparatus comprising:
    an interface configured to send a first signal to the device, the first signal comprising an indication for indicating the cooperation mode, the indication being associated with a profile of the apparatus, the profile defining one or more user signals or characteristics of one or more user signals; and
    a surface configured to allow a user to generate a user input based on a desired operation of the device, said user input generated by an interaction between the user and the apparatus to be detected by a sensor of the device, independent of said interface in the cooperation mode, the sensor configured to generate a user signal based on said user input,
    wherein the user signal or a characteristic of the user signal is defined by the user.

14. The server for providing the profile of the apparatus to the device as defined in claim 3, wherein the server is configured to:
    receive a request for the profile of the apparatus from the retriever of the device; and
    in response to the request, provide the third signal including the data representing the profile of the apparatus to the retriever of the device.

15. A method for providing the profile of the apparatus to the device as defined in claim 3, the method comprising the steps of:
    receiving a request for the profile of the apparatus from the retriever of the device; and
    in response to the request, providing the third signal including the data representing the profile of the apparatus to the retriever of the device.

* * * * *